Aug. 11, 1942.        J. TJAARDA        2,292,585
ENGINE
Filed Dec. 4, 1940        2 Sheets-Sheet 2
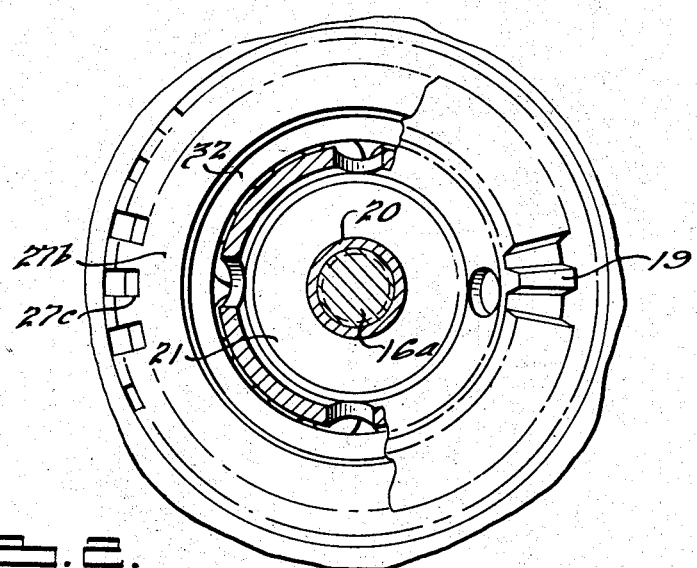
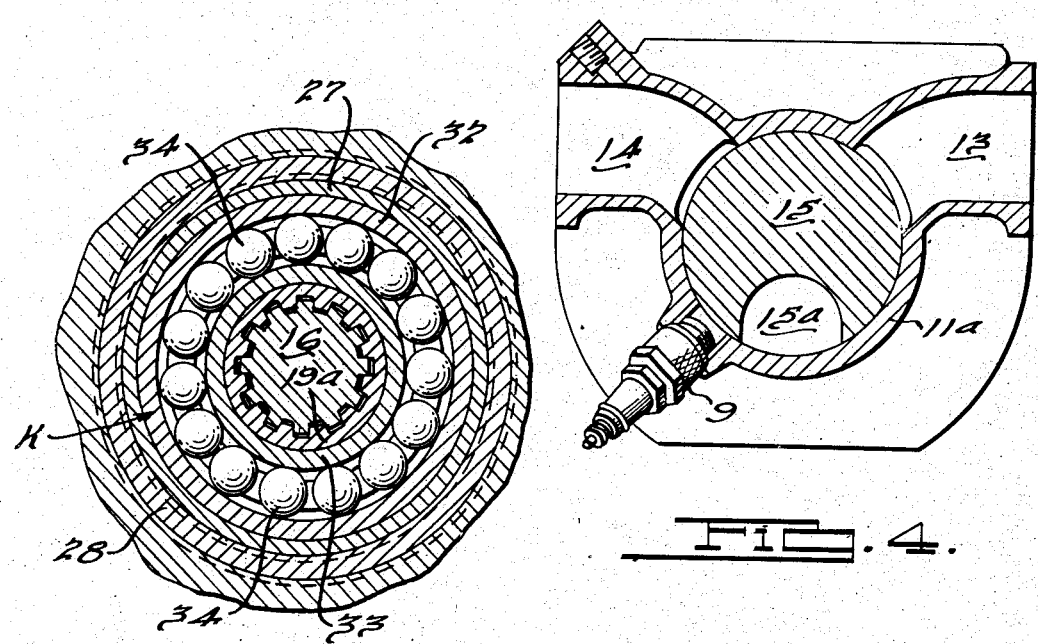
INVENTOR
John Tjaarda.
BY
Dike, Calvert & Gray
ATTORNEYS.

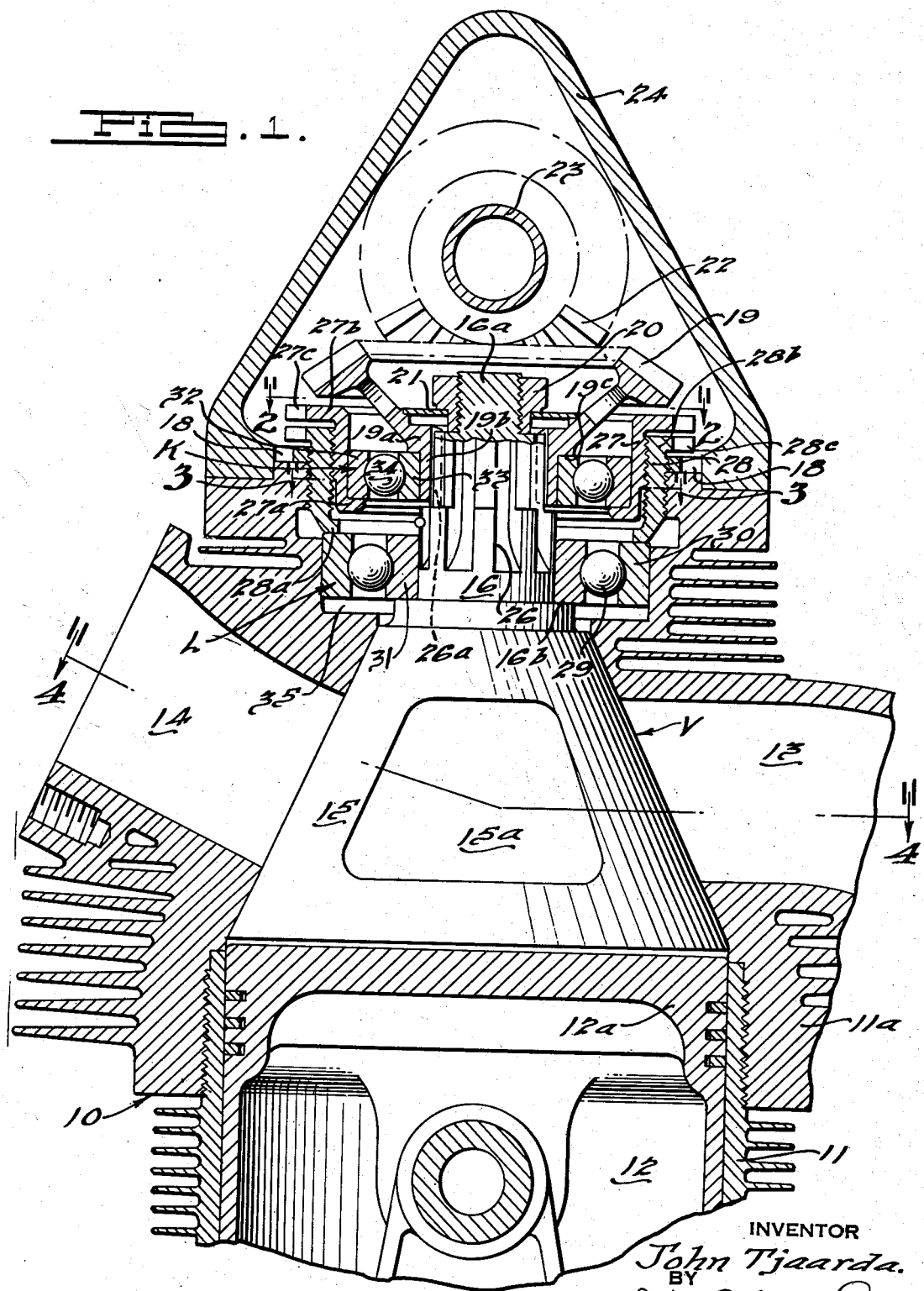

Patented Aug. 11, 1942

2,292,585

UNITED STATES PATENT OFFICE 2,292,585

ENGINE

John Tjaarda, Detroit, Mich., assignor to Briggs Manufacturing Company, Detroit, Mich., a corporation of Michigan Application December 4, 1940, Serial No. 368,490

19 Claims. (Cl. 123—80)

This invention relates to internal combustion engines and more particularly to rotary valves and to an improved adjustable valve bearing cage.

In the operation of the rotary cone type valve having a stem or stub journalled through bearing races located within the cylinder head of an internal combustion engine, it has been the usual custom to clamp machined preloaded bearings into place within a bearing nut or cage so that the outer bearing races adhere to the inner surfaces of the bearing cage and the inner bearing races adhere by friction to the rotatable stem of the valve. The degree of preloading of the bearings in most instances is calculated before their insertion into the cage. It has been found, however, that within a relatively short period of time, due to constant frictional wear at high rotating speeds, the bearing balls have a tendency to become loose within the bearing races. This results in loose bearings effecting a misalinement of the valve stem and a consequent inefficient operation of the valve. To correct this difficulty it has been necessary to remove the loose bearings from the bearing cage and substitute for them bearings that are properly preloaded.

It is an important object of the invention to provide an adjustable bearing cage for a rotary cone type valve mounted within the head portion of an internal combustion engine cylinder wherein the valve bearings may be preloaded without their removal from the bearing cage.

It is another object of the invention to provide an adjustable bearing cage for a rotary cone type valve mounted within the head portion of an internal combustion engine cylinder wherein the valve bearings may be preloaded without their removal from the bearing cage, said bearing cage being further adjustable to permit adjustment of said valve within the head portion of the cylinder.

It is another object of the invention to provide a bearing cage of the foregoing character for a rotary cone type valve mounted within the head of an internal combustion chamber cylinder, said bearing cage designed to receive bearing assemblies comprising rotatable and non-rotatable elements, said elements being adjustable to load the bearings within the bearing cage and to position said valve in said head portion.

It is still another object of the invention to provide an adjustable bearing cage for a rotary cone type valve mounted within the head portion of an internal combustion engine cylinder comprising two inter-threaded members, said members being adjustable one within the other to load the bearings and to position the valve within said head portion.

Other objects of this invention will appear in the following description and appended claims, reference being had to the accompanying drawings forming a part of this specification wherein like reference characters designate corresponding parts in the several views.

Fig. 1 is a sectional view of an internal combustion engine cylinder embodying the present invention.

Fig. 2 is a sectional view taken substantially along lines 2—2 of Fig. 1 looking in the direction of the arrows.

Fig. 3 is a sectional view taken substantially along lines 3—3 of Fig. 1 looking in the direction of the arrows.

Fig. 4 is a sectional view taken substantially along the lines 4—4 of Fig. 1 looking in the direction of the arrows.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring particularly to Fig. 1, there is shown for the purpose of illustrating the invention a section of an internal combustion engine cylinder. This cylinder generally designated as 10 comprises a barrel portion 11 and an alloy head portion 11a suitably connected thereto. The barrel portion 11 is provided with a piston 12 operably connected to a crankshaft (not shown). A charge of combustible mixture is supplied to the cylinder through the medium of a riser 13. It will be noted that the supply of fuel mixture is from the inner side of the cylinder outwardly toward the cylinder and that the exhaust gases are permitted to escape through exhaust port 14 located at the outer side of the cylinder. In the present instance the intake of the combustible mixture into the cylinder, also the scavenging and exhaust of the products of combustion, are controlled by a rotary cone valve mechanism generally designated as V positioned in the outer extremity of the cylinder. The intake passage 13 of the cylinder and the exhaust passage 14 communicate with inlet and outlet ports mounted in the cylinder head. The rotary cone valve V shown in Fig. 1 has a cone portion 15 integrally attached to an outwardly projecting valve stem or stub shaft 16. The shaft 16 is provided along its outer extending portion with a series of spaced vertical splines or grooves 26 which are adapted to mesh with keys or tongues 26a formed in the hub portion 19a of a ring gear 19. The ring gear 19 shown in Figs. 1 and 2 is in mesh with gear 22 secured to a valve driving shaft 23. The valve actuating shaft 23 together with gear 19 operates in a longitudinally extending housing 24. The shaft 23 is preferably hollow to minimize weight and to permit the flow of oil therethrough for lubricating purposes. The inner face of the rotary cone valve 15 is adapted to cooperate with the head 12a of the piston, the valve having an interior dome-like combustion chamber 15a with which the intake and exhaust passages 13 and 14 communicate at intervals during the rotation of the valve. The spark plug 9, as shown in Fig. 4, for the cylinder also communicates with the combustion chamber 15a at predetermined intervals during the rotation of the valve for the purpose of firing the compressed mixture.

The valve stem 16 supports upon its outer extremity a threaded extension 16a which is adapted to receive a nut 20 which in turn engages a Bellvue spring washer 21, the latter engaging the hub portion 19a of the gear 19 thereby holding the keys 26a of the gear hub securely in mesh with the splines 26 of the valve stem.

The hub 19a of gear 19 and the valve stem 16 rotate within separate ball bearing assemblies. An upper bearing assembly designated by the letter K cooperates with the gear hub 19a and a lower bearing assembly generally designated as L cooperates with the valve stem 16. In the present embodiment of the invention the lower bearings are of a larger construction to provide adequate means for retaining the valve stem in alinement. The upper bearing K comprises a rotatable inner bearing race 33, a plurality of bearing balls 34 and a non-rotatable outer bearing race 32. The inner race 33 frictionally engages the outer surface 19b and the shoulder 19c of the gear hub 19a. The outer race nests tightly against an inner bearing cage 27 and is supported therein by an inwardly extending flange 27a.

The lower bearing L comprises a rotatable inner bearing race 31, a plurality of bearing balls 29 and a non-rotatable outer bearing race 30 and resides in a suitable cylinder head recess or opening 35. The inner race 31 of the lower bearing frictionally engages the outer surface of the stem 16 and is supported by an abutment 16b formed at the juncture of the stem and the valve cone 15. The outer race 30 tightly engages the inner wall of the cylinder head recess 35 and is secured in position by an inwardly extending flange 28a formed along the lower portion of an outer bearing cage 28. Pressure is exerted downwardly against the inner bearing races 31 and 33 by means of the engagement of the nut 20 with the Bellvue spring washer 21 which acts through the gear hub 19a against the upwardly extending edge of the inner bearing race 33 which abuts against the shoulder 19c of the gear hub. Resistance to the downward movement of the inner bearing races is met by the abutment 16b located at the base of the stem 16 which engages the downwardly extending edge of the inner bearing race 31. The inner bearing races are thus prevented from separating or spreading but may move inwardly towards each other depending upon the amount of pressure exerted upon the washer 21. The outer bearing races 30 and 32 are free to move apart but are held from moving inwardly together by flange 28a of cage 28 and flange 27a of cage 27. A lock nut 18 engages the bearing cage 28 locking the parts together once the desired adjustment of the bearings and the valve cone is attained.

The inner and outer surfaces of the outer bearing cage 28 are threaded to engage with cooperating threaded portions of the inner bearing cage 27, cylinder head 11a and the lock nut 18. The bearing cages or rings 27 and 28 terminate at their upper edges in outwardly extending annular flanges 27b and 28b respectively which are provided at their peripheral edges with square or hexagon wrench receiving portions 27c and 28c respectively. By applying a wrench to these portions the cages may be readily turned for adjusting the same. It is to be noted that a turning of the outer bearing cage 28 moves the entire assembly, including the bearings, the valve and the gear, up or down depending upon the desired adjustment.

In the operation of the invention there are several ways in which the bearings may be preloaded and at the same time permit a proper adjustment of the valve cone with relation to the interior surfaces of the cylinder head. The preferred method consists of the following steps: The threaded bearing cage 27 is first partially unscrewed from the bearing cage 28 thereby effecting a partial separation or spreading apart of the non-rotatable outer bearing races 30 and 32, the bearing race 32 being drawn slightly upwardly by flange 27a of the bearing cage 27 and the bearing race 30 being held in place by flange 28a of the bearing cage 28. The action of partially unscrewing the bearing cage 27 from the cage 28 has a tendency to increase the pressure upon the Bellvue washer 21 which in turn clamps the inner rotatable bearing races 31 and 33 closer together. This action produces a loading or tightening of the ball bearings 29 and 34 within the races by causing the outer bearing race 32 to be moved upwardly in parallel relation to inner bearing race 33 and by causing the inner bearing race 31 to be moved upwardly in parallel relation to inner bearing race 30. The desired degree of loading or tightening of the bearings may be attained by a proper adjustment of the bearing cage 27. After the bearings have been loaded the clearance between the cone 15 of the rotary valve and the inner surfaces of the cylinder head may be adjusted to the desired degree by screwing the bearing cage 28 up or down depending upon whether an increased or decreased clearance is needed. The bearings thus tightened or loaded and the proper relationship between the valve cone and the cylinder wall attained, the position of cage 28 is maintained or fixed by a tightening of the lock nut 18. Thus it is apparent that the present invention provides a simple method by which the bearings may be preloaded within their cages without removal therefrom and at the same time permit an adjustment of the valve cone within the cylinder head.

I claim:

1. In an internal combustion engine, a cylinder having a head portion, a plurality of independently adjustable bearings mounted in the said head portion, a rotatable valve supported in 2,292,585

3 ings, said interthreaded cages being bodily movable within the said head to position said valve in said head portion.

9. In an internal combustion engine having a cylinder head and a rotary valve in said head, a bearing within which a portion of said valve is journalled comprising an inner rotatable bearing race fixed with relation to the valve, an outer non-rotatable bearing race including a cage, bearing elements interposed between said races, and means cooperating with said cage for adjusting the outer race independently of and relatively to the inner race axially of the valve.

10. In an internal combustion engine having a cylinder head and a rotary valve in said head, a bearing within which a portion of said valve is journalled comprising an inner rotatable bearing race fixed with relation to the valve, an outer non-rotatable bearing race, bearing elements interposed between said races, and means for adjusting the outer race relatively to the inner race axially of the valve, said means including a cage embracing the outer race and supported for bodily movement.

11. In an internal combustion engine having a cylinder head and a rotary valve in said head, a bearing within which a portion of said valve is journalled comprising an inner rotatable bearing race fixed with relation to the valve, an outer non-rotatable bearing race, bearing elements interposed between said races, and means for adjusting the outer race relatively to the inner race axially of the valve, said means comprising a pair of relatively adjustable members, one engaging said outer race.

12. In an internal combustion engine having a cylinder head and a rotary valve in said head, a bearing within which a portion of said valve is journalled comprising an inner rotatable bearing race fixed with relation to the valve, an outer non-rotatable bearing race, bearing elements interposed between said races, and means for adjusting the outer race relatively to the inner race axially of the valve, said means comprising a pair of rings in threaded engagement with each other and one thereof positioned to engage said outer race.

13. In an internal combustion engine having a cylinder head and a rotary valve in said head, a bearing within which a portion of said valve is journalled comprising an inner rotatable bearing race fixed with relation to the valve, an outer non-rotatable bearing race, bearing elements interposed between said races, and a pair of axially adjustable members, one thereof adjustable to shift said outer race and the other adjustable to shift said valve.

14. In an internal combustion engine having a cylinder head and a rotary valve in said head, a bearing within which a portion of said valve is journalled comprising an inner rotatable bearing race fixed with relation to the valve, an outer non-rotatable bearing race, bearing elements interposed between said races, and a pair of axially adjustable members, one thereof adjustable to shift said outer race and the other adjustable to shift said valve, said members being in threaded engagement and being adjustable axially of the valve.

15. In an internal combustion engine having a cylinder head and a rotary valve in said head, a bearing within which a portion of said valve is journalled, a driving gear secured to said valve portion, a bearing within which a portion of said gear is journalled, each bearing comprising inner 3. In an internal combustion engine, a cylinder having a head portion, a plurality of adjustable bearings mounted in the said head portion, each bearing including a rotatable inner bearing race, a plurality of bearing elements and a non-rotatable outer bearing race, a rotatable valve supported in said head portion having a stem journalled in said bearings, and means comprising concentrically nested interconnected members for relatively adjusting the inner bearing race and the outer bearing race to load the bearings and to position said valve in said head portion.

4. In an internal combustion engine, a cylinder having a head portion, a plurality of adjustable bearings, said bearings including rotatable and non-rotatable elements adapted to permit parallel movement therebetween, a rotatable valve supported in said head portion having a stem journalled in said bearings, and means for independently adjusting said rotatable and non-rotatable elements in parallel relation to each other to load the bearings, said means comprising a pair of interthreaded rings.

5. In an internal combustion engine, a cylinder having a head portion, a bearing assembly including a plurality of bearings mounted in said head portion, a rotatable valve supported in said head portion having a stem journalled in said bearing assembly, and a plurality of concentrically nested adjustable bearing cages to load said bearings and to position the said valve in said head portion.

6. In an internal combustion engine, a cylinder having a head portion, a plurality of adjustable bearings, said bearings including rotatable and non-rotatable elements, a rotatable valve supported in said head portion having a stem journalled in said bearings, concentrically nested bearing cages adapted to permit adjustment of said bearing elements to load the bearings and to position said valve in said head portion.

7. In an internal combustion engine, a cylinder having a head portion, a plurality of adjustable bearings, said bearings including rotatable and non-rotatable elements, a rotatable valve supported in said head portion having a stem journalled in said bearings, bearing cages adapted to permit adjustment of said bearing elements to load the bearings and to position said valve in said head portion, said bearing cages being threaded to turn one within the other.

8. In an internal combustion engine, a cylinder having a head portion, a plurality of adjustable bearings, said bearings including rotatable and non-rotatable elements, a rotatable valve supported in said head portion having a stem journalled in said bearings, a plurality of interthreaded bearing cages adapted to permit adjustment of said bearing elements to load the bearand outer races and bearing elements interposed therebetween, means for adjusting the outer race of one bearing relatively to the inner race to load said elements, and means for adjusting the outer race of the other bearing to adjust the position of said valve.

16. In an internal combustion engine having a cylinder head and a rotary valve in said head, a plurality of bearings within which a portion of said valve is journalled, each bearing comprising an inner-rotatable bearing race fixed with relation to the valve, an outer non-rotatable bearing race, bearing elements interposed between said races, and means for adjusting the outer races relatively to the inner races axially of the valve.

17. In an internal combustion engine having a cylinder head and a rotary valve in said head, a plurality of bearings within which a portion of said valve is journalled, each bearing comprising an inner-rotatable bearing race fixed with relation to the valve, an outer non-rotatable bearing race, bearing elements interposed between said races, and means for adjusting the outer races relatively to the inner races axially of the valve, said means including a pair of axially adjustable members, one thereof adjustable to shift said races to load said elements and the other adjustable to shift said valve.

18. In an internal combustion engine having a cylinder head and a rotary valve in said head, a bearing within which a portion of said valve is journalled, a driving gear secured to said valve portion, a bearing within which a portion of said gear is journalled, each bearing comprising inner and outer races and bearing elements interposed therebetween, and a pair of axially adjustable members, one thereof adjustable to shift the outer race of one bearing relatively to the inner race to load said elements, and the other adjustable to shift the outer race of the other bearing to adjust the position of said valve.

19. In an internal combustion engine having a cylinder head and a rotary valve in said head, a bearing within which a portion of said valve is journalled, a driving gear secured to said valve portion, a bearing within which a portion of said gear is journalled, each bearing comprising inner and outer races and bearing elements interposed therebetween, means for adjusting the outer race of one bearing relatively to the inner race to load said elements, and means for adjusting the outer race of the other bearing to adjust the position of said valve, said members being in threaded engagement and being adjustable axially of the valve.

JOHN TJAARDA.